(12) United States Patent
Rosenboom

(10) Patent No.: US 6,491,598 B1
(45) Date of Patent: Dec. 10, 2002

(54) POWER TRANSMISSION BELT

(75) Inventor: Jay Ahren Rosenboom, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 22 days.

(21) Appl. No.: 09/686,397

(22) Filed: Oct. 9, 2000

(51) Int. Cl.[7] .............................. F16G 1/00; B32B 27/08; C08K 5/09
(52) U.S. Cl. ........................ 474/260; 474/263; 474/205; 524/397; 428/515
(58) Field of Search ................................. 474/263, 260, 474/264, 271, 205, 191, 270, 265, 250, 202; 524/269, 397, 494; 428/515, 137, 156, 163

(56) References Cited

U.S. PATENT DOCUMENTS

| | | | |
|---|---|---|---|
| 5,610,217 A | * 3/1997 | Yarnell et al. | 474/264 |
| 5,650,454 A | 7/1997 | Hoover et al. | 524/47 |
| 5,747,551 A | 5/1998 | Lewandowski et al. | 522/95 |
| 5,860,883 A | * 1/1999 | Jonen et al. | 474/205 |
| 5,883,148 A | 3/1999 | Lewandowski et al. | 522/95 |
| 5,985,970 A | 11/1999 | Chodha et al. | 524/269 |
| 6,177,202 B1 | * 1/2001 | Takehara et al. | 428/156 |

FOREIGN PATENT DOCUMENTS

JP 401126974 A * 10/1989 ................. 474/249

OTHER PUBLICATIONS

*Peroxide Curing of DuPont Nordel® Hydrocarbon Rubber*, by Gilbert T. Perkins, DuPont Company, Elastomer Chemicals Department, Elastomers Laboratory. Publication date Oct. 1977.
*Peroxide Crosslinking of EPDM Rubber*, Akzo Chemicals Inc. Publication date Jan., 1994.

* cited by examiner

*Primary Examiner*—David A. Bucci
*Assistant Examiner*—Marcus Charles
(74) *Attorney, Agent, or Firm*—Bruce J. Hendricks; John D. DeLong

(57) ABSTRACT

There is disclosed an endless power transmission belt having a tension section, a cushion section and a load-carrying section disposed between the tension section and cushion section; and the belt containing a free radically cured elastomeric composition comprising the reaction product of an ethylene alpha olefin elastomer, from 0.1 to 40 parts by weight per 100 parts by weight of total rubber (phr) of an acrylate polybutadiene having a molecular weight ($M_N$) within the range of from about 500 to about 500,000 and from 0.1 to 40 phr of a curative coagent.

19 Claims, 1 Drawing Sheet

POWER TRANSMISSION BELT

BACKGROUND OF THE INVENTION

Recent developments in the automotive industry have resulted in higher engine output in a more compact engine compartment. As a result, power transmission belts on these engines have been required to operate under higher load, at high tensions and at high temperatures. This environment demands a high quality belt capable of withstanding these severe conditions along with consumer demand for longer lasting belts. Therefore, there exists a need for new and improved belts to quench the demand in the industry.

SUMMARY OF THE INVENTION

The present invention relates to a power transmission belt that is characterized by a free radically cured elastomeric composition comprising the reaction product of an ethylene-alpha olefin elastomer, an acrylated polybutadiene and a curative coagent.

BRIEF DESCRIPTION OF THE FIGURES

The accompanying figure shows embodiments of this invention in which.

DETAILED DESCRIPTION OF THE INVENTION

There is disclosed an endless power transmission belt having a tension section, a cushion section, and a load-carrying section disposed between the tension section and cushion section, and the belt containing a free radically cured elastomeric composition comprising the reaction product of an ethylene alpha olefin elastomer, from 0.1 to 40 parts by weight per 100 parts by weight of total rubber (phr) of an acrylate polybutadiene having a molecular weight ($M_N$) within the range of from about 500 to about 500,000, and from 0.1 to 40 phr of a curative coagent.

The present invention relates to a new and improved power transmission belt. The power transmission belt of the present invention may be embodied in accordance with the three conventional-type of designs of power transmission belt. In the first design, the cushion section is fabric-faced, ground short fiber-reinforced cushion section or molded gum with short fiber flocked faced cushion section. In the second design, the cushion section has a cut edge or fabric jacketless belt which has plies of rubber-coated fabric or plies of fiber reinforced stock as the base material. The third design is a textile jacketed belt which is wrapped with one or more jackets of textile fabric.

Figure 1:
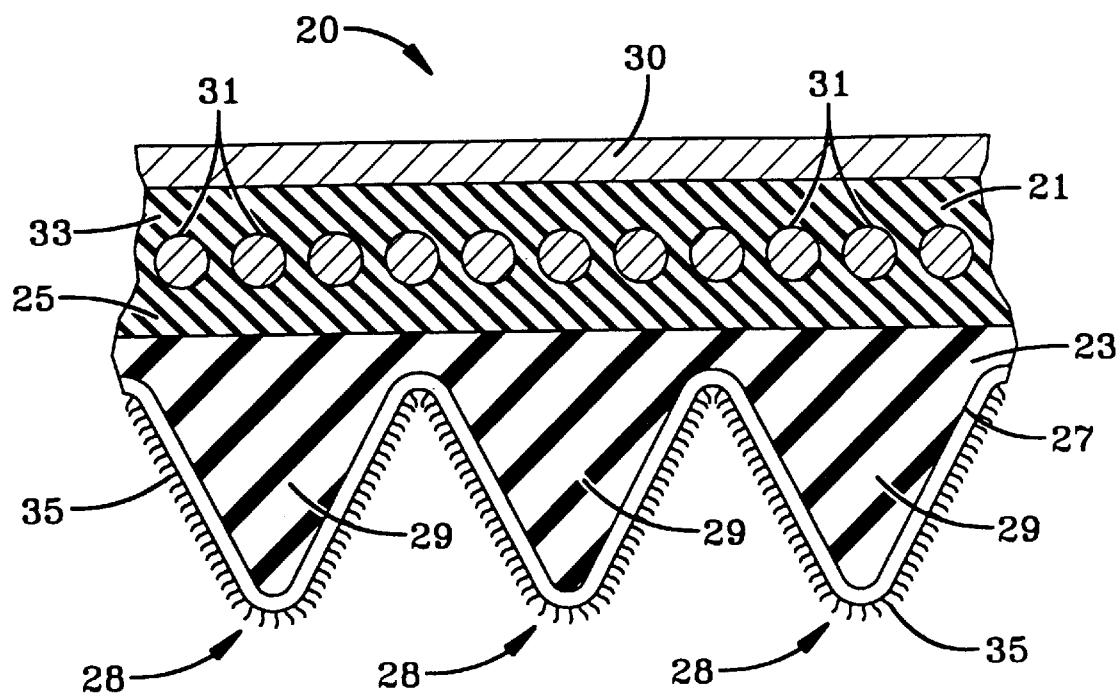
FIG. 1 is a fragmentary perspective view illustrating one embodiment of an endless power transmission belt of this invention.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in short center drives, exercise equipment, automotive drives, farm equipment, so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 23 and a load-carrying section 25 disposed between the tension section 21 and cushion section 23. The belt 20 may optionally have an inside ply or inner fabric layer 27, adhered to a drive surface 28 and three ribs 29 or Vs which are fabric-coated. The belt 20 of FIG. 1 has a fabric backing 30. The fabric backing 30 may be bidirectional, non-woven, woven or knitted fabric. The fabric backing layer 30 may be frictioned, dipped, spread, coated or laminated.

In accordance with the belt of FIG. 1, the fabric facing layer 27 may be made from a bi-directional, non-woven, woven or knitted fabric. The preferred fabric layer 27 is non-woven.

The fabrics to be used on the facing layer 27 may be made of conventional materials including nylon (such as nylon 4,6, nylon 6,6 and nylon 6), polyester/rayon, cotton, cotton/rayon, polyester, cotton/polyester, nylon/polyester, cotton/nylon, Lycrar™ (segmented polyurethane), aramid, rayon, and the like. Preferably, the fabric is made of polyester/rayon.

The load-carrying section 25 has load-carrying means in the form of load-carrying cords 31 or filaments which are suitably embedded in an elastomeric cushion or matrix 33 in accordance with techniques which are well known in the art. The cords 31 or filaments may be made of any suitable material known and used in the art. Representative examples of such materials include aramids, fiberglass, nylon, polyester, cotton, steel, carbon fiber and polybenzoxazole.

The drive surface 28 of the belt 20 of FIG. 1 is multi-V-grooved. In accordance with other embodiments, it is contemplated herein the belts of the present invention also include those belts where the drive surface of the belt may be flat, single V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The belt 20 of FIG. 1 has one drive surface 28. However, it is contemplated herein that the belt may have two drive surfaces (not shown) such as in a double-sided belt. In such an instance, one or both drive surfaces may be with fabric as described herein. Preferably, the belt 20 has one drive surface.

The elastomeric compositions for use in the tension section 21 and cushion section 22 may be the same or different.

The elastomeric composition for use in the tension section 21 and/or cushion section 22 contains an ethylene alpha olefin rubber or elastomer. In addition to the ethylene alpha olefin rubber or elastomer, additional rubbers may be used. Generally speaking, from 50 to 100 parts by weight of the total rubber is an ethylene alpha olefin elastomer. Preferably, from 70 to 100 parts by weight is an ethylene alpha-olefin elastomer. The ethylene-alpha-olefin elastomer includes copolymers posed of ethylene and propylene units (EPM), ethylene and butene units, ethylene and pentene units or ethylene and octene units (EOM) and terpolymers composed of ethylene and propylene units and an unsaturated component (EPDM), ethylene and butene units and an unsaturated component, ethylene and pentene units and an unsaturated component, ethylene and octene units and an unsaturated component, as well as mixtures thereof. As the unsaturated component of the terpolymer, any appropriate non-conjugated diene may be used, including, for example, 1,4-hexadiene, dicyclopentadiene or ethylidenenorbornene (ENB). The ethylene-alpha-olefin elastomer preferred in the present invention contains from about 35 percent by weight to about 90 percent by weight of the ethylene unit, from about 65 percent by weight to about 5 percent by weight of the propylene or octene unit and 0 to 10 percent by weight of the unsaturated component. In a more preferred embodiment, the ethylenealpha-olefin elastomer contains from about 50 percent to about 70 percent by weight of the ethylene unit and, in a most preferred embodiment, the ethylene-alpha-olefin elastomer contains from about 55 percent to about 65 percent of the ethylene unit. The most preferred ethylene-alpha-olefin elastomer is EPDM.

When it is desired to use a rubber in addition to the ethylene alpha olefin elastomer, the additional rubber will range from 0 to 50 parts by weight, of the total rubber used. Such rubber may be selected from the group consisting of silicone rubber, polychloroprene, epichlorohydrin, acrylonitrile rubber, hydrogenated acrylonitrile rubber, zinc salts of unsaturated carboxylic acid ester grafted hydrogenated nitrile butadiene elastomer, natural rubber, synthetic cis-1, 4-polyisoprene, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, non-acrylated cis-1,4-polybutadiene, and mixtures thereof Preferably, from 0 to 30 parts by weight of the total 100 parts by weight of elastomer is one or more rubber listed above.

The elastomeric composition contains from 0.1 to 40 phr of an acrylated polybutadiene. Preferably, from 1 to 10 phr is present. The polybutadiene may be a random polybutadiene polymer containing both 1,4 and 1,2 butadiene units. The amount of 1,2 vinyl bands may range from 15 to about 90 percent by weight 1,2 vinyl bands. Preferably, from 20 to 70 percent by weight of 1,2 vinyl bands are present. The acrylated polybutadiene may be prepared from a Ziegler Natta polymerization. The acrylated polybutadiene may have a molecular weight ($M_N$) ranging from 500 to 500,000. Preferably, the molecular weight ranges from 1,000 to 70,000. Preferred acrylated polybutadienes are sold by Ricon Resins Inc. of Grand Junction, Colo., under the trademark RICACRYL™. A specific example is RICACRYL 3500 (mol weight $M_N$ of approximately 6400 and a Brookfield viscosity of approximately 50,000 centipoise).

In the elastomeric composition containing a mixture of ethylene-alpha olefin elastomer, optionally second rubber, and acrylated polybutadiene may be used in the tension section, cushion section, or both sections of the belt. Preferably, the elastomeric composition is used in the cushion section.

A free radical crosslinking reaction is used to cure the rubber containing composition in the belt. The reaction may be via UV cure system or peroxide cure system. Well-known classes of peroxides that may be used include diacyl peroxides, peroxyesters, dialkyl peroxides and peroxyketals. Specific examples include dicumyl peroxide, n-butyl-4,4-di (t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, α,α'-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof. The preferred peroxide is α,α'-bis(t-butylperoxy) diisopropylbenzene. Typical amounts of peroxide ranges from 1 to 12 phr (based on active parts of peroxide). Preferably, the amount of peroxide ranges from 2 to 6 phr.

A coagent is present during the free radical crosslinking reaction. Coagents are monofunctional and polyfunctional unsaturated organic compounds which are used in conjunction with the free radical initiators to achieve improved vulcanization properties. Representative examples include organic acrylates, organic methacrylates, divinyl esters, divinyl benzene, bis-maleimides, triallylcyanurates, polyalkyl ethers and esters, metal salts of an alpha-beta unsaturated organic acid and mixtures thereof The coagent may be present in a range of levels. Generally speaking, the coagent is present in an amount ranging from 0.1 to 40 phr. Preferably, the coagent is present in an amount ranging from 2 to 15 phr.

As mentioned above, one class of coagents are acrylates and methacrylates. Representative examples of such coagents include di-, tri-, tetra- and penta-functional acrylates, di-, tri-, tetra- and penta-functional methacrylates and mixtures thereof. Specific examples of such coagents include 1,3-butylene glycol diacrylate, 1,3-butylene glycol dimethacrylate, 1,4-butanediol diacrylate, 1,4-butanediol dimethacrylate, 1,6 hexanediol diacrylate, 1,6 hexanediol dimethacrylate, 2-henoxyethyl acrylate, alkoxylated diacrylate, alkoxylated nonyl phenol acrylate, allyl methacrylate, caprolactone acrylate, cyclohexane dimethanol diacrylate, cyclohexane dimethanol, methacrylate diethylene glycol diacrylate, diethylene glycol dimethacrylate, dipentaerythritol pentaacrylate, dipropyleneglycol diacrylate, di-trimethylolpropane tetraacrylate, ethoxylated trimethylolpropane triacrylate, ethoxylated bisphenol A dimethacrylate, ethoxylated nonylphenol acrylate, ethoxylated tetrabromo bisphenol A diacrylate, ethoxylated bisphenol A diacrylate, ethoxylated bisphenol dimethacrylate, ethoxylated trimethylolpropane triacrylate, ethoxylated bisphenol A diacrylate, ethylene glycol dimethacrylate, glycidyl methacrylate, highly propoxylated glyceryl triacrylate, isobornyl acrylate, isobornyl methacrylate, isodecyl acrylate, isodecyl methacrylate, isooctyl acrylate, lauryl acrylate, methoxy polyethylene glycol monomethacrylate, methoxy polyethylene glycol monomethacrylate, neopentyl glycol diacrylate, neopentyl glycol dimethacrylate, octyldecyl acrylate, pentaacrylate ester, pentaerythritol tetraacrylate, pentaerythritol triacrylate, polyethylene glycol diacrylate, polyethylene glycol dimethacrylate, propoxylated glyceryl triacrylate, propoxylated neopentyl glycol diacrylate, propoxylated allyl methacrylate, propoxylated glyceryl triacrylate, propoxylated trimethylolpropane triacrylate, propoxylated trimethylolpropane triacrylate, stearyl acrylate, stearyl methacrylate, tetraethylene glycol diacrylate, tetraethylene glycol dimethacrylate, tetrahydrofurfuryl acrylate, tetrahydrofurfuryl methacrylate, tridecyl acrylate, tridecyl methacrylate, triethylene glycol diacrylate, triethylene glycol dimethacrylate, trifunctional acrylate ester, trifunctional methacrylate ester, trimethylolpropane triacrylate, trimethylolpropane triacrylate, trimethylolpropane trimethacrylate, tripropylene glycol diacrylate, tripropylene glycol diacrylate, tris (2-hydroxy ethyl) isocyanurate triacrylate, tris (2-hydroxy ethyl) isocyanurate triacrylate, and tris (2-hydroxy ethyl) isocyanurate trimethacrylate.

The metal salts of α, β-unsaturated organic acids include the metal salts of acids including acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids. The metals may be zinc, cadmium, calcium, magnesium, sodium or aluminum. Zinc diacylate and zinc dimethacrylate are preferred.

Conventional carbon blacks may also be present in the composition. Such carbon blacks are used in conventional amounts ranging from 5 to 250 phr. Preferably, the carbon blacks are used in an amount ranging from 20 to 100 phr. Representative examples of carbon blacks which may be used include those known by their ASTM designations N110, N121, N242, N293, N299, S315, N326, N330, M332, N339, N343, N347, N351, N358, N375, N550, N582, N630, N624, N650, N660, N683, N754, N762, N907, N908, N990 and N991.

It is readily understood by those having skill in the art that the rubber composition would be compounded by methods generally known in the rubber compounding art, such as mixing the various constituent rubbers with various commonly used additive materials such as, for example, curing aids and processing additives, such as oils, resins including tackifying resins and plasticizers, fillers, pigments, fatty acid, waxes, antioxidants and antiozonants. The additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, polyethylene glycol, naphthenic and/or paraffinic processing oils. Typical amounts of antioxidants comprise about 1 to about 5 phr. A representative antioxidant is trimethyl-dihydroquinoline. Typical amounts of fatty acids, if used, which can include stearic acid comprise about 0.5 to about 3 phr. Typical amounts of waxes comprise about 1 to about 5 phr. Often microcrystalline and carnauba waxes are used. Typical amounts of plasticizer, if used, comprise from 1 to 100 phr. Representative examples of such plasticizers include dioctyl sebacate, chlorinated paraffins, and the like.

Various non-carbon black fillers and/or reinforcing agents may be added to increase the strength and integrity of the rubber composition for making the power transmission belt of the present invention. An example of a reinforcing agent is silica. Silica may be used in the present composition in amounts from about 0 to 80 parts, and preferably about 10 to 20 parts, by weight based on 100 parts of rubber.

Figure 2:
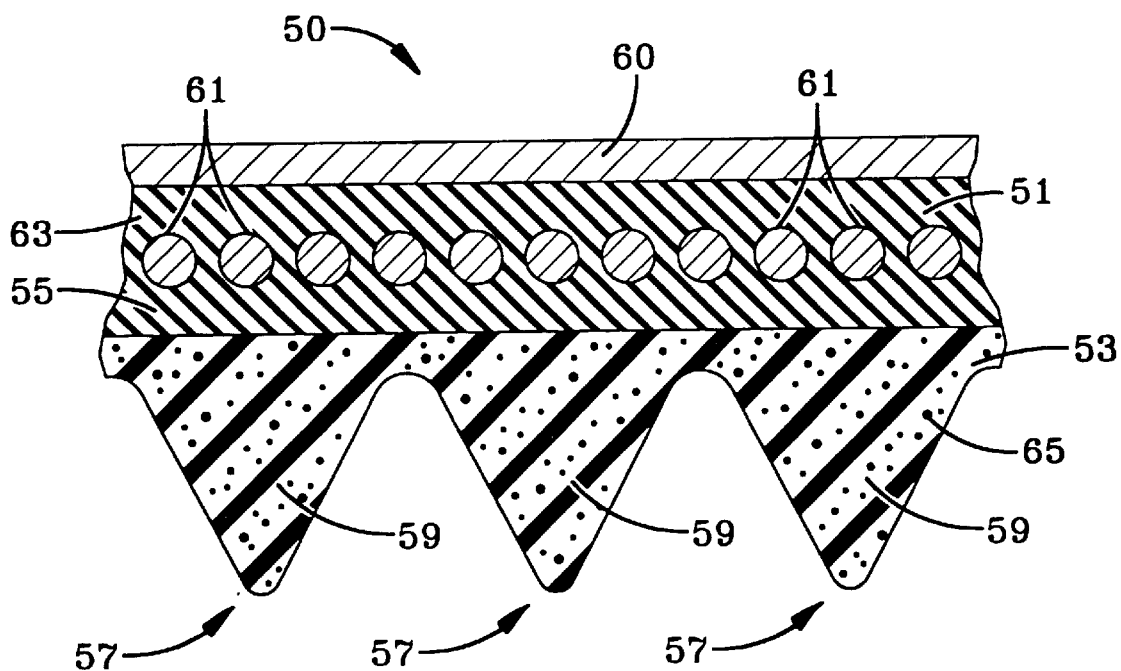
FIG. 2 is a fragmentary perspective view illustrating one embodiment of an endless power transmission belt of this invention.

The elastomer composition may also have fibers or flock distributed throughout. This is particularly the case, as shown in FIG. 2. The fibers or flock to be distributed throughout the elastomer mix may be any suitable material and is preferably non-metallic fibers such as cotton or fibers made of a suitable synthetic material include aramid, nylon, polyester, PTFE, fiberglass, and the like. Each fiber may have a diameter ranging between 0.001 inch to 0.050 inch (0.025 mm to 1.3 mm) and length ranging between 0.001 inch to 0.5 inch (0.025 mm to 12.5 mm). The fibers may be used in an amount ranging from 5 to 50 phr.

In addition to the above, solid inorganic lubricants may be present in the elastomer composition. Representative examples of such lubricants include molybdenum disulfide, PTFE, molybdenum diselenide, graphite, antimony trioxide, tungsten disulfide, talc, mica, tungsten diselenide and mixtures thereof. The amount of such solid inorganic lubricants, if used, will generally range from 1 to 25 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition for use in the belt is generally carried out at conventional temperatures ranging from about 160° C. to 190° C. Preferably, the curing is conducted at temperatures ranging from about 170° C. to 180° C.

In accordance with one embodiment, the surface of the fabric 27, if used, on the drive surface may be covered with a short fiber flock 35 by means of an adhesive to directly adhere the flock 35 to the fabric 27. The short fiber flock 35 for use in this invention is characterized by a length range of from 0.12 mm to 9.6 mm and a denier (grams per 9000 meters) of 0.5 to 50. Preferably, the length (measured in the longest direction) ranges from 0.25 to 6 mm and the denier ranges from 0.8 to 25. The most preferred flock has a length of from 0.5 mm to 3 mm and a denier of from 1 to 3. The short fiber flock 35 is uniformly distributed directly on the surface of the drive surface 28 of the power transmission belt 20. In the embodiment shown in FIG. 1, the flock is not dispersed in the elastomer of the compression section 23 but rather the flock is separated from the elastomer in the compression section 23 by the fabric 27. The short fiber flock 35 may be derived from cotton, carbon fiber, rayon, acrylic, Teflon™ (polytetrafluoroethylene), nylon, polyester, aromatic polyamide (aramid), fiberglass and mixtures thereof. The flock 35 may be produced by means known to those skilled in the art, such as by reducing the length of a mass of already short fibers by cutting or grinding. The ground fibers are then graded by screening to eliminate overly long fibers.

There are many types of water- and solvent-based adhesives which may be used to adhere the flock to the surface of the fabric. The particular adhesive that may be used may vary. One conventional adhesive which may be used is known in the art as a RFL (resorcinol-formaldehyde-latex) adhesive. The RFL adhesives comprise a polymer latex which may be based on natural rubber, styrene-butadiene rubber, acrylonitrile-butadiene rubber (NBR), hydrogenated acrylonitrile-butadiene rubber (HNBR) and vinyl pyridine. An optional ingredient to the RFL is an isocyanate compound. Additional examples of conventional adhesives are the resin emulsions sold by B F Goodrich which include polyvinyl acetate, polyacrylic, polyvinyl chloride and polyurethane. Cement solutions (organic) of polymers may also be used as an adhesive. Representative polymers include natural rubber, polychloroprene, acrylonitrile-butadiene copolymers, polyisoprene, zinc salts of unsaturated carboxylic acid ester grafted hydrogenated nitrile butadiene elastomers, styrene-butadiene rubbers, polybutadiene, EPDM, hydrogenated acrylonitrile-butadiene copolymers, polyurethane and ethylene-acrylic elastomers.

The adhesive is first applied to the fabric 27 and the flock 35 is thereafter applied. The adhesive may be applied to the fabric either before or after being adhered to the compression section 23 of the belt. Preferably, the adhesive and flock are first applied to the fabric 27 and thereafter the flock-treated fabric 27 is applied to the belt 20.

There are many methods available for applying flock adhesives. In roll-to-roll flocking, the adhesive may be applied with a knife, reverse roll or roll-over-platform coaters. Engraved rolls, spray applicators and rotary screen printers may also be used. Other flock adhesive application methods include silk-screen, dipping, brushing and spraying.

The thickness of the adhesive layer may vary. Generally speaking, the thickness of the adhesive may range from about 0.05 mm to 1 mm. Preferably, the thickness of the adhesive will range from 0.05 to 0.4 mm.

The short fiber flock 35 may be applied to the adhesive-treated fabric in a number of means and thereafter the flocked fabric applied to an uncured belt. The flock may be applied to the adhesive-coated surface either mechanically, electrostatically or by means of a combination of both techniques. Mechanical flocking can be further divided into windblown and beater-bar methods. Electrostatic flocking sometimes incorporates a pneumatic process to propel fibers toward a surface in a windstream. The beater bar method involves passage of the adhesive-treated fabric over a series of polygonal rollers that rapidly rotate to vibrate the substrate. The vibration is used to drive the fiber onto the adhesive. Fibers may be fed to the substrate by gravity from a flock module. Windblown mechanical flocking uses an airstream to deliver the flock to the adhesive-treated fabric. Electrostatic flocking is a known technique which utilizes a field of static electricity to orient fibers and promote their perpendicular alignment. This technique is recommended with longer fibers. In the electrostatic technique, the adhesive-coated substrate passes between the potentials of a high voltage electrostatic field. An electrode is utilized to give the flock a charge. The charged fibers become aligned with the electric field lines of force. The ground potential is formed by the substrate and/or the grounded parts of the machine. The flock is thus attracted to the adhesive where it becomes embedded. Via this method, most of the fibers adhering to the adhesive-coated surface are perpendicular to it. The windblown and electrostatic methods may be utilized simultaneously through pneumatic/electrostatic flocking. With this method, an airstream containing the fibers are directed through a nozzle. At the exit of the nozzle, a charge orients the fibers according to field lines.

The short fiber flock may be applied to the fabric of the belt in a variety of levels. For example, the amount of flock may range from 0.05 kg/m2 to 1.0 kg/m2. The preferred level ranges from about 0.1 kg/m2 to 0.5 kg/m2.

After the fiber flock has been applied, the flocked fabric may be cleaned by suction and the like. Thereafter, the adhesive is dried.

Referring to FIG. 2, there is shown an endless power transmission belt 50 according to another embodiment. Similar to the belt 20 of FIG. 1, the belt 50 comprises a tension section 51, a cushion section 53 and a load-carrying section 55 disposed between the tension section 51 and cushion section 53. Unlike the belt 20 of FIG. 1, the belt 50 of FIG. 2 does not have a fabric layer on the drive surface. The belt 50 of FIG. 1 does have a plurality of ribs 59 or Vs and a fabric-backing 60. The load-carrying section 55 has load-carrying means in the form of load-carrying cords 61 or filaments which are embedded in an elastomeric matrix 63. The elastomeric compound located in the cushion section 53 is illustrated as being fiber loaded 65.

As known to those skilled in the art, power transmission belts may be built on a drum device. First, the backing is applied to drum as a sheet. Next, any tension section is applied as a sheet followed by spiralling onto the drum the cord or tensile members (load-carrying section). Thereafter, the cushion section is applied and followed by the fabric, if used. The assembled laminate or slab and drum are placed in a mold and cured. After cure, ribs are cut into the slab and the slab cut into belts in a manner known to those skilled in the art.

EXAMPLE 1

Six compositions were made from the recipes illustrated in Table I. Sample 6 is considered a control due to the absence of an acrylated polybutadiene. All ingredients, except the peroxide, were added in the non-productive stage of mixing. The physical properties for each composition are provided in Table II.

TABLE 1

| | Sample 1 | Sample 2 | Sample 3 | Sample 4 | Sample 5 | Sample 6 |
|---|---|---|---|---|---|---|
| EPDM[1] | 100 | 100 | 100 | 100 | 100 | 100 |
| Carbon black[2] | 50 | 50 | 50 | 50 | 50 | 50 |
| Process oil[3] | 10 | 10 | 10 | 10 | 10 | 10 |
| Cotton flock[4] | 16.5 | 16.5 | 16.5 | 16.5 | 16.5 | 16.5 |
| Aramid fiber[5] | 7.2 | 7.2 | 7.2 | 7.2 | 7.2 | 7.2 |
| Molyldenium disulfide | 5 | 5 | 5 | 5 | 5 | 5 |
| Antioxidant[6] | 1 | 1 | 1 | 1 | 1 | 1 |
| Acrylated PBD[7] | 2 | 2 | 2 | 2 | 2 | 0 |
| 1,3-butylene glycol dimethacrylate[8] | 6.94 | 0 | 0 | 0 | 0 | 0 |
| Diethylene glycol dimethacrylate[9] | 0 | 7.5 | 0 | 0 | 0 | 0 |
| Diethylene glycol dimethacrylate[10] | 0 | 0 | 7.5 | 0 | 0 | 0 |
| Zinc Dimethacrylate[11] | 0 | 0 | 0 | 5.2 | 0 | 0 |
| Trimethyolpropane Trimethacrylate[12] | 0 | 0 | 0 | 0 | 6.94 | 6.94 |
| Peroxide[13] | 4 | 4 | 4 | 4 | 4 | 4 |

In Table 2, all samples were cured for 30 minutes at 171° C. The torque properties were all measured according to ASTM D5289. Shore A hardness was measured according to ASTM D2240. Tear strength, peak stress and break stress were measured using ASTM D624 and a modified ASTM D624. The modification was the samples were tested perpendicular to the milling direction so that the fibers were oriented perpendicular to the testing direction. Tensile strength, peak stress, break at stress, elongation at break and modulus were measured on a Monsanto Tensometer 10 according to ASTM D412 and a modified ASTM D412. The modification was the samples were tested perpendicular to the milling direction so that the fibers were oriented perpendicular to the testing direction. Peel adhesion was tested according to ASTM D413 with the exception being that the sample was produced on a drum, rather than a flat surface and the tearing was at about 90° rather than 180°.

TABLE 2

| Sample Compounds | Sample 1 | Sample 2 | Sample 3 | Sample 4 | Sample 5 | Sample 6 |
|---|---|---|---|---|---|---|
| Moving Die Rhemeter 30 min. @ 171° C. | | | | | | |
| Minimum torque (dNm) | 4.01 | 3.75 | 3.95 | 3.89 | 4.06 | 3.5 |
| Maximum torque (dNm) | 33.82 | 37.89 | 34.15 | 33.87 | 35.9 | 33.58 |
| $T_1$ (min) | 0.72 | 0.55 | 0.59 | 0.45 | 0.53 | .51 |
| $T_{90}$ (min) | 15.58 | 14.14 | 14.62 | 14.1 | 13.71 | 13.4 |
| Torque at $T_{90}$ | 30.84 | 34.48 | 31.13 | 30.87 | 32.72 | 30.57 |
| Shore A Hardness | 87 | 86 | 87 | 87 | 87 | 87 |
| Tear against Fiber Direction | | | | | | |
| Peak stress (KN/m) | 47.92 | 41.54 | 46.67 | 51.39 | 40.93 | 36.09 |
| Break stress (KN/m) | 47.78 | 41.45 | 46.63 | 50.89 | 40.81 | 35.27 |
| Tear with Fiber Direction | | | | | | |
| Peak stress (KN/m) | 44.19 | 49.58 | 45.49 | 53.20 | 43.50 | 49.16 |
| Break stress (KN/m) | 18.07 | 23.33 | 17.32 | 21.38 | 26.25 | 47.25 |
| Tensile against Fiber Direction | | | | | | |
| Peak stress (MPa) | 7.47 | 8.53 | 7.64 | 9.94 | 8.06 | 9.04 |
| Peak strain (%) | 260 | 245 | 274 | 287 | 270 | 271 |
| Break stress (MPa) | 7.46 | 8.52 | 7.62 | 9.93 | 8.03 | 9 |
| Elongation at Break (%) | 259.5 | 244 | 274 | 285 | 269 | 270 |
| 5% modulus (MPa) | 0.79 | 0.82 | 0.88 | 0.88 | 0.86 | 0.63 |
| 10% modulus (MPa) | 1.19 | 1.3 | 1.34 | 1.45 | 1.35 | 1.02 |
| 15% modulus (MPa) | 1.48 | 1.67 | 1.69 | 1.85 | 1.72 | 1.30 |
| 20% modulus (MPa) | 1.69 | 1.95 | 1.94 | 2.2 | 2 | 1.57 |
| 25% modulus (MPa) | 1.88 | 2.2 | 2.18 | 2.49 | 2.27 | 1.76 |
| 50% modulus (MPa) | 2.66 | 3.26 | 3.07 | 3.71 | 3.13 | 2.37 |
| 100% modulus (MPa) | 4.04 | 4.68 | 4.33 | 5.45 | 4.12 | 3.11 |
| Tensile with Fiber Direction | | | | | | |
| Peak stress (MPa) | 8.28 | 8.55 | 8.86 | 9.46 | 8.57 | 11.37 |
| Peak strain (%) | 44 | 36 | 31 | 42 | 293 | 284 |
| Break stress (MPa) | 8.12 | 7.82 | 8.44 | 9.34 | 8.55 | 11.29 |
| Elongation at Break (%) | 164 | 163 | 169 | 54 | 293 | 282 |
| 5% modulus (MPa) | 2.62 | 2.76 | 3.14 | 2.92 | 2.87 | 3.41 |
| 10% modulus (MPa) | 4.51 | 4.59 | 5.39 | 5.25 | 4.92 | 6.03 |
| 15% modulus (MPa) | 5.96 | 6.24 | 7.19 | 7.19 | 6.21 | 7.37 |
| 20% modulus (MPa) | 7.13 | 7.46 | 8.29 | 8.35 | 6.97 | 7.39 |
| 25% modulus (MPa) | 7.74 | 8.15 | 8.77 | 8.97 | 7.21 | 6.88 |
| 50% modulus (MPa) | 8.24 | 8.43 | 8.59 | 9.26 | 6.89 | 6.10 |
| 100% modulus (MPa) | 8.02 | 7.94 | 8.33 | Br | 6.60 | 5.84 |
| Cord Adhesion Test | | | | | | |
| Adhesion (KN/m) | 9.81 | 9.46 | 10.34 | 6.83 | 10.69 | 7.71 |

The use of an acrylated polybutadiene in combination with a curative coagent (Sample 5) achieves a combination of properties which are not achieved when using the curative coagent in the absence of acrylated polybutadiene (Sample 6). Looking at Tensile against Fiber Direction for Samples 5 and 6, the low modulus (5 to 20 percent) values significantly increased with the addition of an acrylated polybutadiene without sacrificing elongation values. The increase in low modulus (5 to 20 percent) values signifies an increase in the belts resistance to high tensions and loads. Maintaining elongation is important because elongation is related to the dynamic performance of the belt and is typically sacrificed with increases in low modulus properties. An increase in the adhesion properties is also observed with the present invention. Higher adhesion values signify an increased capacity to transfer load from the driving surface of the belt to the load carrying section and implies a higher belt integrity. Samples 1 through 4, like Sample 5, demonstrates the combination of an acrylated polybutadiene and curative coagent result in improvements to low modulus values and adhesion properties.

While present exemplary embodiments of this invention and methods of practicing the same have been illustrated and described, it will be recognized that this invention may be otherwise variously embodied and practiced within the scope of the following claims.

What is claimed is:

1. An endless power transmission belt comprising:
   (a) a tension section;
   (b) a cushion section; and,
   (c) a load-carrying section disposed between the tension section and cushion section, and the belt containing a free radical cured elastomeric composition comprising a product of an ethylene alpha olefin rubber, from 0.1 to 40 parts by weight per 100 parts by weight of total rubber (phr) of an acrylate polybutadiene having a molecular weight (Mn) within a range of 500 to 500,000, and from 0.1 to 40 phr of a curative coagent.

2. The endless power transmission belt of claim 1 wherein said elastomeric composition comprising
   (a) 50 to 100 parts by weight of an ethylene alpha olefin elastomer; and
   (b) 0 to 50 parts by weight of a rubber selected from the group consisting of silicone rubber, polychloroprene, epichlorohydrin, acrylonitrile rubber, hydrogenated acrylonitrile rubber, zinc salts of unsaturated carboxylic acid ester grafted hydrogenated nitrile butadiene elastomer, natural rubber, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, and mixtures thereof.

3. The endless power transmission belt of claim 2 wherein the amount of acrylated polybutadiene ranges from 1 to 10 phr.

4. The endless power transmission belt of claim 1 wherein said elastomeric composition has been cured with a peroxide selected from the group consisting of diacyl peroxides, peroxyesters, dialkyl peroxides and peroxyketals.

5. The power transmission belt of claim 4 where said peroxide is present in an amount ranging from 1 to 12 phr.

6. The endless power transmission belt of claim 1 wherein the acrylated polybutadiene has a molecular weight ($M_N$) of from 1,000 to 70,000.

7. The endless power transmission belt of claim 1 wherein 100 parts by weight of the rubber used in the elastomeric composition is an ethylene-alpha-olefin elastomer.

8. The endless power transmission belt of claim 1 wherein said elastomer composition is in the cushion section of the belt.

9. The endless power transmission belt of claim 1 wherein said elastomer composition is in the load-carrying section of the belt.

10. The power transmission belt of claim 1 having one driving surface.

11. The endless power transmission belt of claim 1 wherein said elastomeric composition has been cured with a peroxide selected from the group consisting of dicumyl peroxide, n-butyl-4,4-di(t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, α,α'-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof.

12. The endless power transmission belt of claim 1 wherein said ethylene-alpha-olefin elastomer is ethylene-propylene diene terpolymer.

13. The power transmission belt of claim 12 wherein the cushion section contains fibers distributed throughout the elastomer composition.

14. The endless power transmission belt of claim 1 wherein said coagent is selected from the group consisting of organic acrylates, organic methacrylates, divinyl esters, divinyl benzene, bismaleimides, triallylcyanurate, polyallyl ethers and esters, a metal salts of an alpha-beta unsaturated organic acid.

15. The power transmission belt of claim 14 wherein said coagent is selected from the group consisting of di-, tri-, tetra- and penta-functional acrylates, di-, tri-, tetra- and penta-functional methacrylates.

16. The power transmission belt of claim 15 wherein the methacrylate coagent is trimethylolpropane trimethacrylate.

17. The power transmission belt of claim 14 wherein said coagent is a zinc salt of an alpha-beta unsaturated organic acid.

18. The power transmission belt of claim 1 wherein the drive surface of the belt is selected from the group consisting of flat, single V-grooved, multi-V-grooved and synchronous.

19. The power transmission belt of claim 18 wherein the drive surface of the belt is multi-V-grooved.

* * * * *